Dec. 9, 1958     H. SCHNEIDER ET AL     2,863,830
PROCESS FOR DECONTAMINATING LIQUID FLUOROCARBONS
OF OIL SUSPENDED THEREIN
Filed Sept. 24, 1945
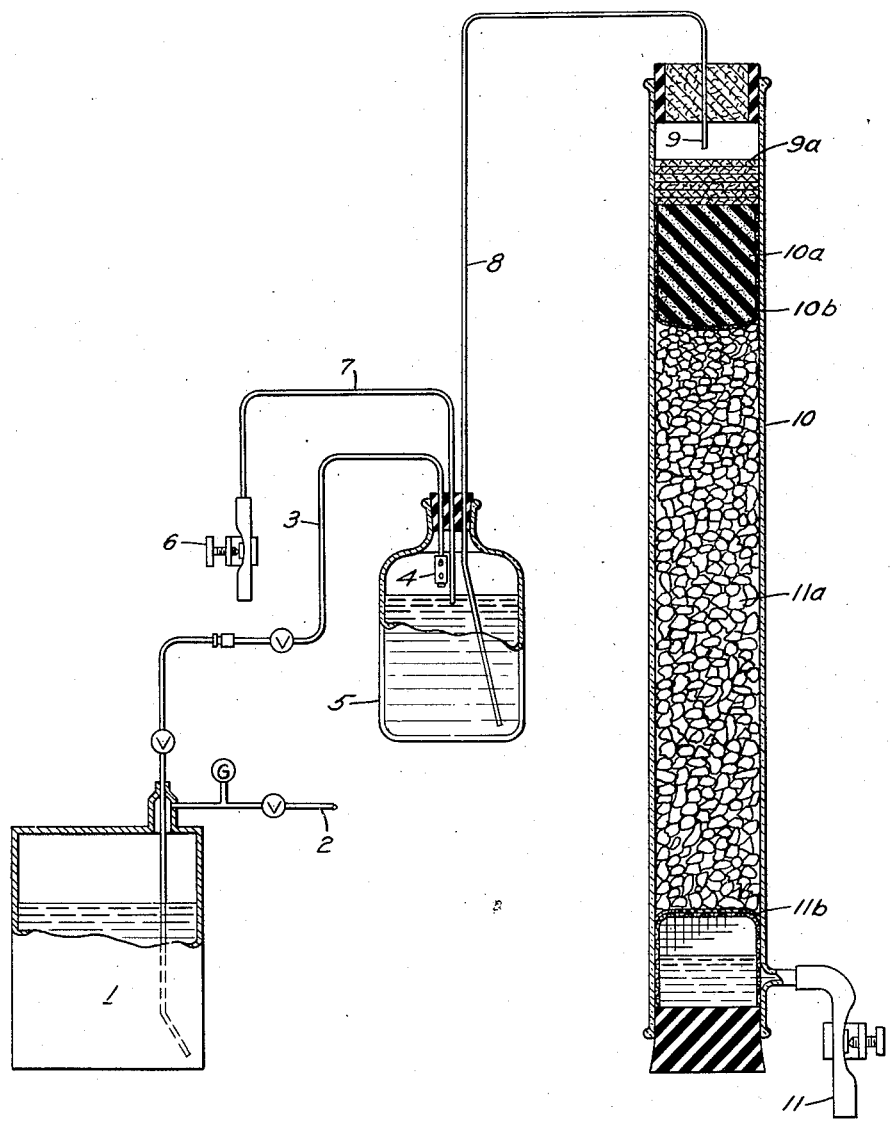
INVENTORS
Byron J. Massey &
Harry Schneider
BY United States Patent Office 2,863,830
Patented Dec. 9, 1958

2,863,830

PROCESS FOR DECONTAMINATING LIQUID FLUOROCARBONS OF OIL SUSPENDED THEREIN

Harry Schneider, Brooklyn, N. Y., and Byron J. Massey, Charleston, W. Va., assignors to the United States of America as represented by the United States Atomic Energy Commission Application September 24, 1945, Serial No. 618,358

6 Claims. (Cl. 210—41)

This invention relates to a method of purifying contaminated organic liquids. More particularly, this invention relates to the removal of impurities such as lubricating oil and water from liquid fluorinated hydrocarbon material.

Recently there has been developed a class of fluorinated hydrocarbons known as fluorocarbons which are compounds consisting solely of fluorine and carbon. Examples of the fluorocarbons are completely fluorinated dimethylcyclohexane ($C_8F_{16}$), completely fluorinated heptane ($C_7F_{16}$), fluorinated lubricating oils, such as a material having the formula ($C_{21}F_{44}$), and the like. Generally speaking, fluorocarbons of the type described above are liquid under atmospheric conditions.

Fluorocarbons of the type described above have been developed for highly specialized uses, and because of the nature of these uses must be in a high state of purity. In other words, the presence of comparatively small amounts of contaminating impurity in fluorocarbons renders these materials incapable of use for the purpose for which they were intended.

For instance, fluorocarbons are widely utilized in processes for the separation of isotopes of uranium by means of mechanical diffusion of gaseous compounds of said isotopes. In a mechanical diffusion process, the isotope separation is effected by maintaining a pressure differential across a porous metallic membrane, thus causing the lighter isotope compound to diffuse through the membrane which is termed a diffusion barrier. Such a process is carried out on a commercial scale in a plurality of diffusers which comprise a plurality of porous tubes through which is passed the gaseous compound of the isotopes to be separated. Because of the critical conditions which must be maintained in the process, the equipment must be carefully tested. Certain of the fluorocarbons are utilized as a test material and therefore must be substantially free of impurity. Other fluorocarbons are utilized as sealants, coolants and lubricants in the operation of the process. As in the case with the fluorocarbons employed for testing purposes, these other fluorocarbons must meet rigid specifications.

After a period of time depending upon the particular use of the fluorocarbon, the material becomes contaminated with impurities such as water and oil, and because of the extremely low tolerances allowed for such contamination cannot be employed in the capacity in which it was originally utilized. For example, generally speaking, it is undesirable to utilize a fluorocarbon containing more than .01% by weight thereof of contaminating lubricating oil.

Water contamination may result from contact with the atmosphere, and oil contamination generally results from passage of the material through pumps and the like equipment wherein a certain amount of oil is unavoidably picked up by the fluorocarbon.

The fluorocarbons are, generally speaking, difficult and expensive to prepare and, hence, it is highly desirable to purify contaminated fluorocarbons to enable their continued reuse in the mechanical diffusion process. This purification process must be of such a nature as to substantially completely remove oil and/or water contamination from the fluorocarbons.

Attempts have been made to remove contaminating impurity such as water and oil from fluorocarbons by means of distillation. However, such a method leaves much to be desired in that a substantial portion of contaminating impurity remains in the fluorocarbons at the end of the distillation procedure.

Another method of purifying fluorocarbons which has been proposed is that involving mechanical separation of the contaminating material from the fluorocarbons. As in the case with distillation, at the end of this particular purifying procedure a considerable portion of contaminating material is found in the fluorocarbon.

It is an object of this invention to provide a method of purifying fluorinated hydrocarbons which have been contaminated with impurity such as water and lubricating oil.

It is a further object of this invention to provide a simple method of removing substantially all of the contaminating oil from fluorocarbons while at the same time removing substantially all of the water contamination.

Still another object of this invention is the provision of a method of purifying contaminated fluorocarbons in which the contaminated fluorocarbon is first freed of a portion of impurity by gravity separation and thereafter freed or remaining impurity by passage through a body of adsorbent material.

These and other objects of the invention will become apparent to the skilled worker in the art upon becoming familiar with the following description.

We have found that substantially all of the contaminating impurity present in a contaminated fluorocarbon may be removed therefrom by a process which comprises removing a portion of the impurity by gravity separation and thereafter passing the remaining mixture through a body of adsorbent material which is preferably maintained in subdivided form.

Our invention may be more readily understood by reference to the accompanying drawing which is a more or less diagrammatic representation of an apparatus for carrying out the process of our invention.

In the drawing, 1 represents a storage drum containing the liquid fluorocarbon to be purified which has been withdrawn from the mechanical diffusion process and placed therein. In drum 1, the larger particles of the contaminating lubricating oil rise to the surface of the body of liquid therein. By the application of air pressure through air inlet 2, the liquid fluorocarbon and remaining impurity are forced through conduit 3 and disperser 4 into the separation tank 5 wherein a further separation of the contaminating lubricating oil is effected. Pinch clamp 6 is left open to bleed the air from separation tank 5 until the level of the liquid therein rises to the opening of conduit 7. When such a condition is attained in separation tank 5, the pinch clamp 6 is closed. As a result of the pressure increase due to the flow of liquid into separation tank 5, fluorocarbon is forced through conduit 8, the opening of which extends below the surface of the liquid in separation tank 5. The lubricating oil, because of a difference in specific gravity from the fluorocarbon, rises to the surface of the liquid in separation tank 5 and may be periodically removed therefrom through conduit 7 by opening pinch clamp 6.

The fluorocarbon leaving separation tank 5 through conduit 8 has been freed of the great majority of the contaminating oil, but still retains a substantial portion of the contaminating water as well as a portion of the contaminating oil which is in the form of a very finely divided suspension in the fluorocarbon. At this state of the process, the suspension of contaminating oil in fluorocarbon is such that further separation by gravity is exceedingly difficult. However, the content of oil is still too great to permit use of the fluorocarbon in a mechanical diffusion process.

From separation tank 5 the contaminated fluorocarbon is passed through conduit 8 and outlet 9 and allowed to fall by gravity through adsorbing column 10 which contains a suitable adsorbent material such as silica gel, activated carbon, activated alumina, and the like. Although a single layer of adsorbent may be employed in column 10, particularly advantageous results are obtained when column 10 contains a plurality of adsorbent layers.

Excellent results have been obtained in the practice of our invention when utilizing in the adsorbing column a layer of silica gel in the upper portion of the column, with a layer of activated alumina in the lower portion of the column.

As illustrated in the drawing, column 10 is provided with a body of filter material 9a such as a plurality of layers of cotton gauze, followed by a layer of silica gel 10a packed in a removable porous container 10b. Following the layer of silica gel is positioned a layer of activated alumina 11a. At the base of the column, the packing is supported upon a wire gauze screen 11b adapted to fit into the base of the column.

In passing through the column, a portion of the water and oil content of the contaminated fluorocarbon is adsorbed by the silica gel and the remaining contamination is then adsorbed by the layer of activated alumina.

The purified fluorocarbon is withdrawn through outlet 11 and passed into storage.

It is to be understood that other forms of apparatus may be utilized in the practice of our invention, and that the process is not restricted in its operation to the particular apparatus as described above. For example, we may utilize a plurality of columns in lieu of the single column illustrated.

Although our invention may be employed in the purification of fluorocarbons containing a wide range of percentages of oil and water contamination, it is particularly adapted to the removal of up to approximately 20% by weight of oil and water contamination from fluorocarbons.

As illustrative of the excellent results to be obtained in the practice of our invention, we have been able to reduce the oil content of contaminated fluorocarbons to as low as 0.001% to 0.0005% by weight, whereas utilizing mechanical methods of separation without an adsorption step resulted in the retention of .02% by weight and higher of oil in fluorocarbons.

It is to be noted that the adsorption step of our process merely involves the percolation of fluorocarbon through adsorbent thus avoiding the use of agitating equipment.

The conditions to be observed in the adsorbing column 10 depend, among other things, upon the percentage of contaminating materials present in the fluorocarbon. However, when treating fluorocarbon containing up to 20% by weight of contaminating materials, particularly advantageous results may be obtained in the practice of our invention when the rate of flow of contaminated fluorocarbon is controlled so that 15 gal. to 55 gal. of contaminated fluorocarbon passes through each cubic foot of adsorbent per hour.

While we have described our invention with reference to the purification of fluorocarbons, it is to be understood that our process may be utilized in the purification of other materials such as dichloro-difluoro-methane. In certain cases wherein our process is employed in the purification of viscous material, it may be desirable to add a diluent having a different boiling point from that of the viscous material, such as trichloro-trifluoro-ethane, less viscous fluorocarbons, for example per-fluoro-n-heptane, and the like, to the viscous material prior to passage through the adsorption zone. After passage through the adsorption zone, the diluent is advantageously removed by distillation. In such cases, particularly advantageous results may be obtained by utilizing a diluent boiling at least 20° F. from the boiling point of the viscous material.

While our invention has been described with reference to particular procedures and with reference to particular examples, it is to be understood that our invention is not limited thereto. Therefore, changes, omissions, and/or additions may be made without departing from the scope of our invention as defined in the appended claims, which are limited only as required by the prior art.

What is claimed is:

1. A process for decontaminating a bulk of liquid fluorocarbon contaminated with oil suspended therein which comprises passing said contaminated bulk of fluorocarbon through a body of at least one adsorbent material chosen from the group thereof consisting of silica gel, activated alumina, and activated carbon, thereby effecting stripping of suspended oil contamination from the fluorocarbon by the adsorbent, and thereafter recovering said fluorocarbon in consequently decontaminated form.

2. In a process for decontaminating a bulk of liquid fluorocarbon contaminated with oil suspended therein comprising effecting incomplete gravitational stratification of said contaminated fluorocarbon system, wherein said oil is concentrated in one stratum and incompletely decontaminated fluorocarbon is concentrated in another stratum, and thereupon separately recovering said fluorocarbon stratum, the improvement step for effecting further decontamination of said incompletely decontaminated fluorocarbon so recovered, which comprises passing said contaminated fluorocarbon through an adsorbent body of silica gel thereby effecting stripping of suspended oil contamination from the fluorocarbon by the adsorbent, and thereafter recovering said fluorocarbon in consequently decontaminated form.

3. In a process for decontaminating a bulk of liquid fluorocarbon contaminated with oil suspended therein comprising effecting incomplete gravitational stratification of said fluorocarbon system thereby concentrating said oil in one stratum and incompletely decontaminated fluorocarbon in another stratum, and thereafter separately recovering said fluorocarbon stratum, the improvement step for subsequently effecting further decontamination from suspended oil of the incompletely decontaminated fluorocarbon so recovered, which comprises passing said recovered fluorocarbon through an adsorbent body of activated alumina, thereby effecting stripping of suspended oil contamination from the fluorocarbon by the adsorbent body, and thereafter recovering said fluorocarbon in its consequently decontaminated form.

4. A process for decontaminating a bulk of liquid fluorocarbon contaminated with oil suspended therein and water which comprises passing said contaminated fluorocarbon through an adsorbent body of silica gel and alumina, thereby effecting simultaneous stripping of contaminating water and suspended oil from the fluorocarbon by the adsorbent body, and thereafter recovering said fluorocarbon in its consequently decontaminated form.

5. In a process for decontaminating a bulk of liquid fluorocarbon contaminated with oil suspended therein and water comprising effecting incomplete gravitational stratification of said fluorocarbon system thereby concentrating said oil in one stratum and incompletely decontaminated fluorocarbon in another stratum, and thereafter separately recovering said fluorocarbon stratum, the improvement step for subsequently effecting further decontamination from water and suspended oil of the incompletely decontaminated fluorocarbon so recovered, which comprises passing said recovered fluorocarbon through an adsorbent body of silica gel and activated alumina, thereby effecting simultaneous stripping of contaminating water and suspended oil from the fluorocarbon by the adsorbent body, and thereafter recovering said fluorocarbon in its consequently decontaminated form.

6. In a process for decontaminating a bulk of liquid fluorocarbon contaminated with oil suspended therein and water comprising effecting incomplete gravitational stratification of said fluorocarbon system thereby concentrating said oil in one stratum and incompletely decontaminated fluorocarbon in another stratum, the improvement step for subsequently effecting further decontamination from water and suspended oil of the incompletely decontaminated fluorocarbon so recovered, which comprises passing said recovered fluorocarbon first through an adsorbent body of silica gel and then through an adsorbent body of activated alumina, thereby effecting stripping of contaminating water and suspended oil from the fluorocarbon by said adsorbent bodies, and thereafter recovering said fluorocarbon in its consequently decontaminated form.

References Cited in the file of this patent
UNITED STATES PATENTS

| | | |
|---|---|---|
| 748,981 | Oliver | Jan. 5, 1904 |
| 1,072,035 | Richter | Sept. 2, 1913 |
| 1,166,802 | Albert et al. | Jan. 4, 1916 |
| 1,571,986 | Weindel | Feb. 9, 1926 |
| 1,793,304 | Boyer | Feb. 17, 1931 |
| 2,137,605 | Derr | Nov. 22, 1938 |
| 2,308,715 | Reed | Jan. 19, 1943 |
| 2,322,316 | Rummelsburg | June 22, 1943 |
| 2,356,890 | Schulze | Aug. 29, 1944 |
| 2,695,321 | Cines | Nov. 23, 1954 |